United States Patent [19]

Hatchadoorian et al.

[11] Patent Number: 5,358,583
[45] Date of Patent: * Oct. 25, 1994

[54] APPARATUS AND METHOD FOR SHAPING FIBER REINFORCED RESIN MATRIX MATERIALS AND PRODUCT THEREOF

[75] Inventors: Edward Hatchadoorian; Steven J. Medwin, both of Wilmington, Del.

[73] Assignee: E. I. Du Pont de Nemours and Company, Wilmington, Del.

[*] Notice: The portion of the term of this patent subsequent to Apr. 27, 2010 has been disclaimed.

[21] Appl. No.: 135,241

[22] Filed: Oct. 13, 1993

Related U.S. Application Data

[60] Continuation of Ser. No. 971,151, Nov. 5, 1992, abandoned, which is a continuation-in-part of Ser. No. 710,803, Jun. 4, 1991, abandoned, which is a continuation-in-part of Ser. No. 603,280, Oct. 25, 1990, Pat. No. 5,206,036, which is a division of Ser. No. 463,898, Jan. 9, 1990, Pat. No. 5,077,110, which is a continuation-in-part of Ser. No. 347,054, May 4, 1989, Pat. No. 4,927,581, which is a continuation-in-part of Ser. No. 259,837, Oct. 19, 1988, abandoned.

[51] Int. Cl.$^5$ ............................................. B29C 55/00
[52] U.S. Cl. ..................................... 264/257; 264/291; 264/294; 264/339; 264/137; 156/166; 156/245; 156/441
[58] Field of Search ............... 156/166, 180, 441, 181, 156/245; 264/257, 258, 108, 288.4, 290.2, 290.5, 290.7, 291, 292, 231, 339, 137, 294

[56] References Cited

U.S. PATENT DOCUMENTS

| | | |
|---|---|---|
| 2,434,379 | 1/1948 | Wiesner et al. |
| 2,446,089 | 7/1948 | Hochreiter |
| 2,850,071 | 9/1958 | Kraybill |
| 2,856,634 | 10/1958 | Ames |
| 2,939,179 | 6/1960 | Penman et al. |
| 3,073,373 | 1/1963 | Wheeler et al. |
| 3,354,253 | 11/1967 | Rasmussen |
| 3,426,569 | 2/1969 | Brauer et al. |
| 3,530,212 | 9/1970 | Kienle et al. |
| 3,550,422 | 12/1970 | Potter |
| 3,556,888 | 1/1971 | Goldsworthy |
| 3,732,347 | 5/1973 | Hunt |
| 3,827,683 | 8/1974 | Seborg et al. |
| 3,836,412 | 9/1974 | Boustany et al. |
| 3,873,399 | 3/1975 | Goldsworthy et al. |
| 3,908,428 | 9/1975 | MacKenzie |
| 3,914,103 | 10/1975 | Dean et al. |
| 4,318,762 | 3/1982 | Meyer |
| 4,361,527 | 11/1982 | Rau |
| 4,379,798 | 4/1983 | Palmer et al. |
| 4,419,319 | 12/1983 | Reynolds, Jr. et al. |
| 4,445,957 | 5/1984 | Harvey |
| 4,541,884 | 9/1985 | Cogswell et al. ............ 156/166 |
| 4,548,065 | 10/1985 | Vyhnal |
| 4,555,378 | 11/1985 | Martin et al. |
| 4,622,254 | 11/1986 | Nishimura et al. |
| 4,657,615 | 4/1987 | Braun et al. |
| 4,657,717 | 4/1987 | Cattanach et al. |
| 4,704,886 | 11/1987 | Evert et al. |
| 4,789,328 | 12/1988 | Knoll |
| 4,927,581 | 5/1990 | Medwin ..................... 264/257 X |
| 4,960,558 | 10/1990 | Short |
| 5,026,514 | 6/1991 | Hauwiller et al. .............. 264/258 |
| 5,066,351 | 11/1991 | Knoll |
| 5,192,383 | 3/1993 | Cavin ........................ 156/166 X |

FOREIGN PATENT DOCUMENTS 404643 10/1973 U.S.S.R.
811261 4/1959 United Kingdom

*Primary Examiner*—Jeff H. Aftergut

[57] ABSTRACT

A method of shaping elongated composite structures of a resin matrix reinforced with randomly broken fibers oriented in transverse and non-transverse directions with respect to the longitudinal axis of the structure is implemented by a computer aided apparatus for forming the structure. The apparatus is provided with a heated fixed forming tool, a means for stretching the structure from each end and means associated with the forming tool for separately holding each formed component length of the structure in place against the forming tool. The formed structure is characterized by the particular orientation of the fibers in the transverse and non-transverse direction after the structure is formed.

2 Claims, 17 Drawing Sheets

F I G. 13
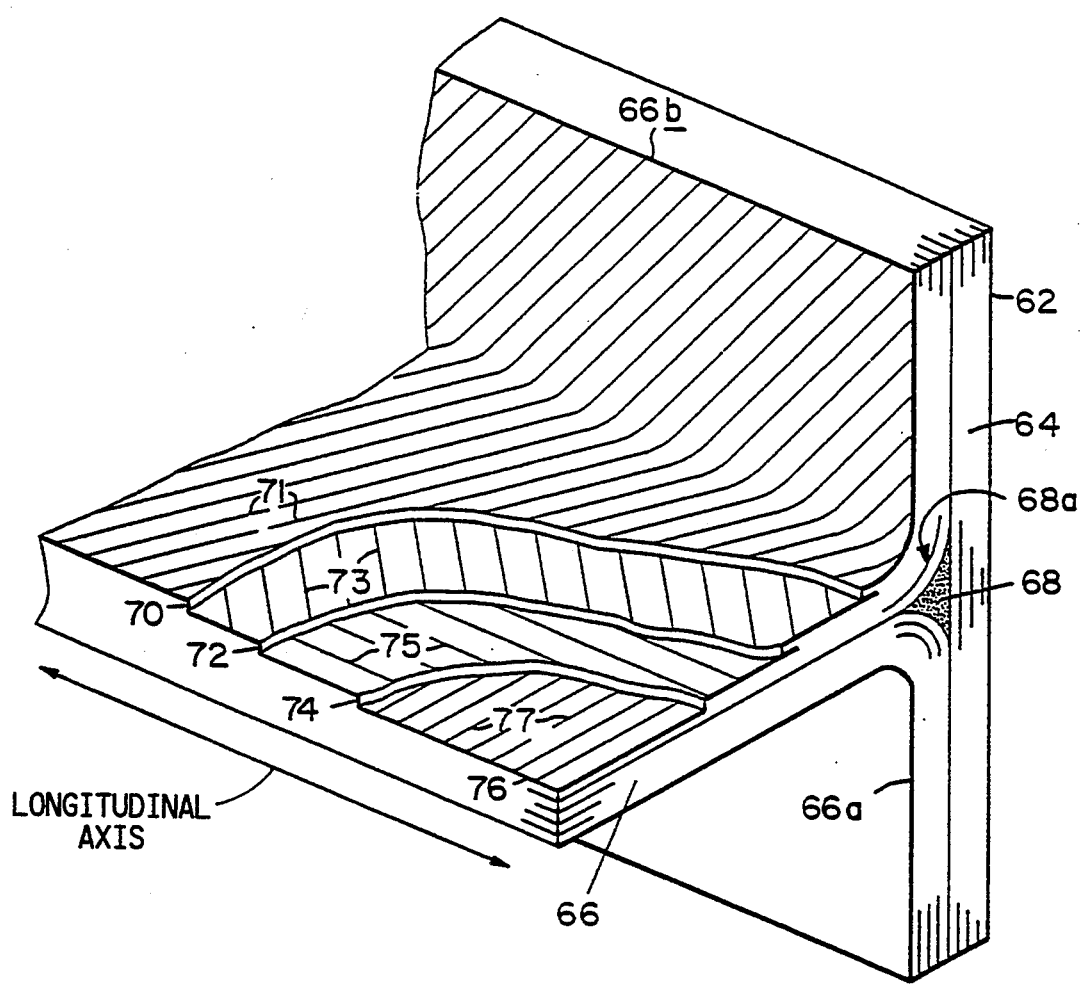

F I G. 18
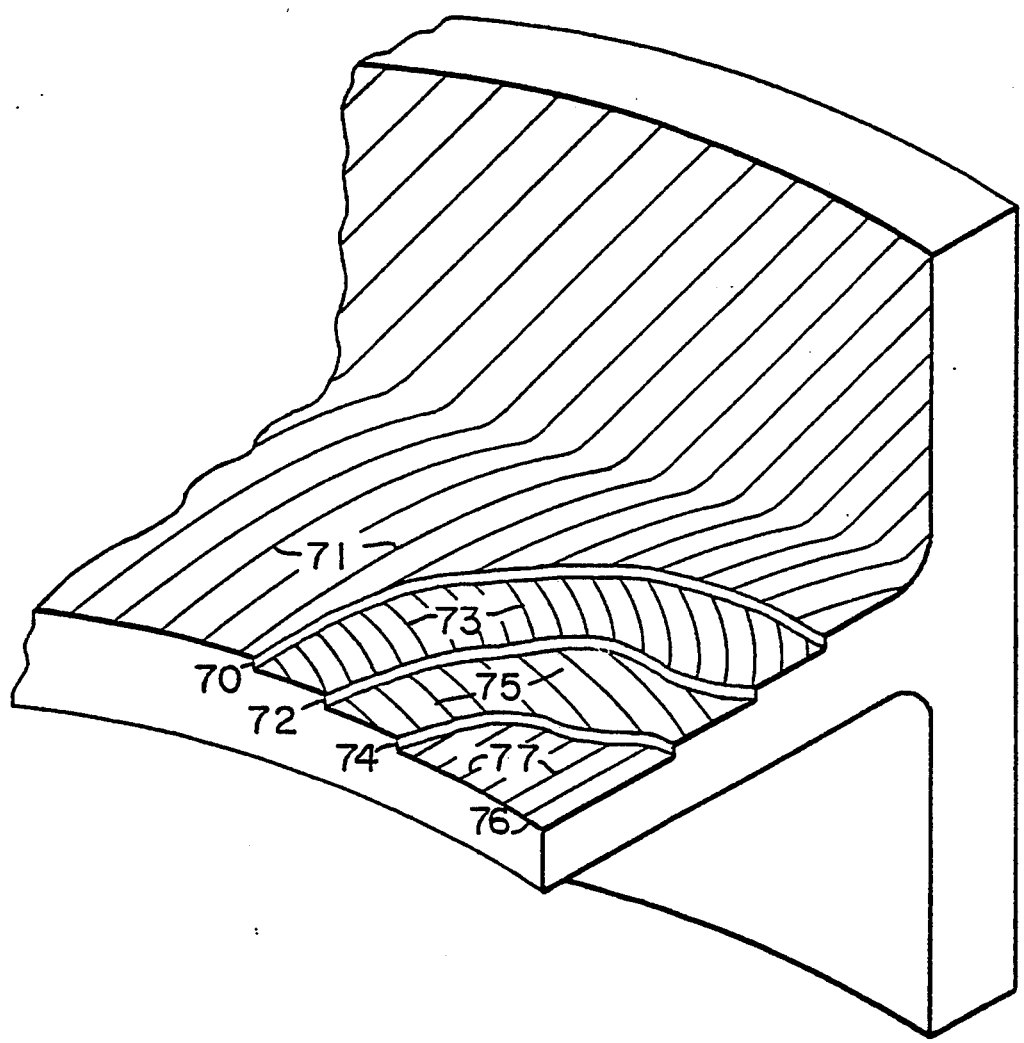

APPARATUS AND METHOD FOR SHAPING FIBER REINFORCED RESIN MATRIX MATERIALS AND PRODUCT THEREOF

This is a continuation of application Ser. No. 07/971,151 filed Nov. 5, 1992, now abandoned, which in turn is a continuation-in-part of pending application Ser. No. 07/710,803 filed Jun. 4, 1991, now abandoned which in turn is a continuation-in-part of pending application Ser. No. 07/603,280 filed on Oct. 25, 1990, now U.S. Pat. No. 5,206,036, which is a divisional application under 37 CFR 1.60 of application Ser. No. 07/463,898 filed on Jan. 9, 1990, now U.S. Pat. No. 5,077,110, which in turn is a continuation-in-part of application Ser. No. 07/347,054 filed on May 4, 1989, now U.S. Pat. No. 4,927,581, which in turn is a continuation-in-part of application Ser. No. 07/259,837 filed on Oct. 19, 1988 and now abandoned.

BACKGROUND OF THE INVENTION

This invention relates to an apparatus and a method for shaping fiber reinforced resin matrix materials. More particularly, the invention relates to an apparatus and method used to shape the material while substantially maintaining the orientation of the fibers in the material relative to each other and the product thereof.

It is known that many thermoplastic resin materials can be shaped by means of various metal forming techniques, such as deep drawing, stretch forming, stamping, binding, etc. It is also known to reinforce the resin material with fibers such as glass, carbon, aramids and the like to provide higher strength, impact resistance and dimensional stability. However, the shaping processes of the prior art when applied to resin material structures that have fibers oriented in multiple directions suffer from the inability to maintain the orientation of the fibers relative to each other during the shaping of the structure. In many cases this leads to lower mechanical strength. One way to overcome this problem has been to hand lay-up the shaped structure from discrete segments of the fiber reinforced resin material, then consolidate the hand layed-up material into final form and in this manner control fiber orientation. This process is very labor intensive, time consuming and costly.

SUMMARY OF THE INVENTION

According to the present invention, a method has been developed which facilitates the shaping of fiber reinforced thermoplastic resin matrix structures from a rigid straight stock shape and provides a method of controlling orientation of the fibers in the structure without the need to hand lay-up the structure. More specifically, the method of shaping into a predefined path an elongated composite structure of resin matrix reinforced with fibers comprises the steps of:

a) defining said path as a plurality of component lengths;

b) stretching said structure from each of its ends by applying a force to each end along its longitudinal axis to shape the structure into successive component lengths defined by said path;

c) heating said structure above the melt temperature but below the degradation temperature of the thermoplastic resin intermediate of its ends while stretching the structure according to step (b);

d) holding each formed component length of the structure in place while successive component lengths are formed; and e) cooling the structure. When the predefined path includes one or more curvilinear portions, each portion is defined as a plurality of component lengths given as dependent variables S, x, y and independent variables L, R and O; where x,y are coordinates of points that generate the cam track path of the apparatus for forming the shaped structure L is the length of the unformed material S is the intermediate arc length of one of component sections R is the radius of curvature of the arc S D is the offset distance of the x,y coordinates from a line tangent to the arc S at its end point T O is the angular location of the coordinate of the tangent point T a) expressing x and y as a function of the independent variables L, R, D and O such that when S=R (90-0), then x = R cos (O)+(L - S) sin (O) +D cos (O)
y = R sin (O)−(L - S) cos (O) +D sin (O)

b) deriving x and y; and c) shaping said composite from a straight length fiber reinforced resin matrix material by stretching said straight length in a path defined by said x,y coordinates.

Preferably the fibers are randomly broken and are oriented in transverse and non-transverse directions with respect to the longitudinal axis of the structure. The hold step (b) maintains the orientation of the fibers relative to one another within about ±5 degrees of their orientation to the longitudinal axis of the shaped structure.

In a preferred embodiment, the shapes are enclosed within thin aluminum sheeting, preferably in the range of 1/32 to ⅛ inch thick depending on the size and geometry of the part to be formed. The purpose of the aluminum sheeting covering the composite material is to maintain the integrity of the softened thermoplastic material during forming. Other materials may be used when the process conditions, such as time, temperature or pressure require them. After the part is formed, then the aluminum or other material is removed.

The product is defined as an elongated composite structure shaped into a predefined path, said path having curvilinear portions, each portion being defined by a radius of curvature about a center, said structure comprising: a resin matrix reinforced with fibers, said fibers being oriented with respect to the longitudinal axis of said structure in substantially transverse and non-transverse directions, said fibers oriented in the non-transverse directions of a curvilinear portion being curved with respect to the center for the radius of that curvilinear portion, said fibers oriented in the transverse direction of a curvilinear portion being directed toward the center for the radius of curvature of that curvilinear portion.

The product may involve a number of different cross sectional shapes that may be classified by the number of laminate surfaces and junctions of those surfaces. For example, an L, C, O, Z or hat section may be considered to have two laminate surfaces and no junctions, while a T or J section may be considered to have three laminate surfaces with one junction. An I or H section has four laminate surfaces with two junctions.

The apparatus of this invention is defined as a computer-aided system that includes a fixed forming tool having a surface defined by the predefined path into which the fiber reinforced structure is to be formed, a means for heating the forming tool, a means for stretching the structure from each of its ends into successive component lengths of the predefined path by applying a force to each end of the structure along its longitudinal axis away from the ends as the structure is formed, and means associated with the forming tool for separately holding each formed component length of the structure in place against the forming tool.

Suitable thermoplastic resinous materials which may be used as a resin matrix include, but are not limited to amorphous polyamides, polyether ketone ketones (PEKK), polyether ether ketones (PEEK), and amorphous or crystalline polyesters.

The resin of choice is reinforced with fibers as, for example, carbon fibers, glass fibers, thermoplastic fibers and aramid fibers.

In order to form certain cross sections, the interior portion of the cross sectional shape needs to be supported by a formable member that is flexible in the forming or longitudinal direction while being rigid in the supporting directions which are substantially perpendicular to the longitudinal direction and can withstand process conditions. In the preferred embodiment, this formable member is a stack of steel strips.

In still a further alternate embodiment, the part may be formed into a continuous contour by forming a relatively small portion, i.e. a component length, of the part and then indexing and forming additional portions by repeating successive clamping, heating, stretching, consolidating and cooling steps.

BRIEF DESCRIPTION OF THE DRAWINGS

FIG. 13 is a perspective view, partially broken away to show the individual plies of a straight stock structure prior to shaping.

FIG. 18 is a perspective view, partially broken away to show individual plies, of a shaped structure made according to the invention.

DESCRIPTION OF THE PREFERRED EMBODIMENT

Figure 1:
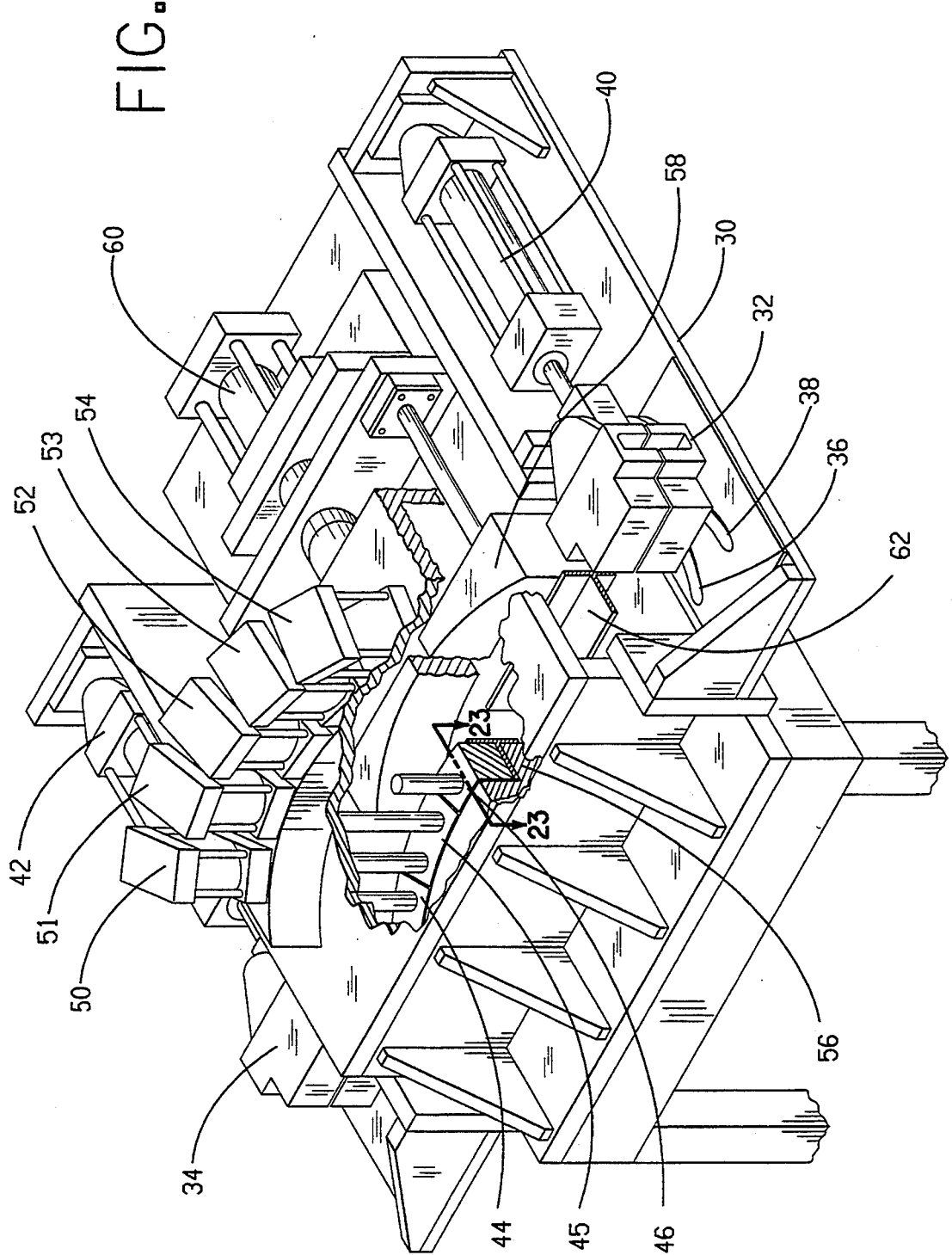
FIG. 1 is a schematic of an apparatus useful in shaping fiber reinforced resin material according to the invention.

The preferred embodiment of this invention provides a method for shaping a fiber reinforced resin matrix structure and, as shown in FIG. 1, the apparatus useful in performing the method generally includes: a frame 30, a pair of end clamps 32, 34 in opposed locations on the frame, two pair of cam tracks positioned at the opposed locations, only one pair 36, 38 shown, a pair of hydraulic cylinders 40, 42 pivotally connected between the frame and the clamps, a plurality of holding tools 44-48 (47, 48 now shown) attached to the frame. Each holding tool being configured to form a component length of the shaped structure. A plurality of hydraulic cylinders 50-54 are attached to the top surface of the holding tools 44-48. A forming die comprising a base tool 56 heated by electric cartridge heaters 85 (FIG. 5) (Watlow Electric Manufacturing Co., Firerod cartridge heater J10A62), fixed to the frame 30 and a cap tool 58 connected to hydraulic cylinder 60, which is fixed to frame 30, for movement toward and away from the base tool is located between end clamps 32, 34. A stock length 62 is clamped at each of its ends in clamps 32, 34 and is positioned between holding tools 44-48 and base tool 56.

Figure 2:
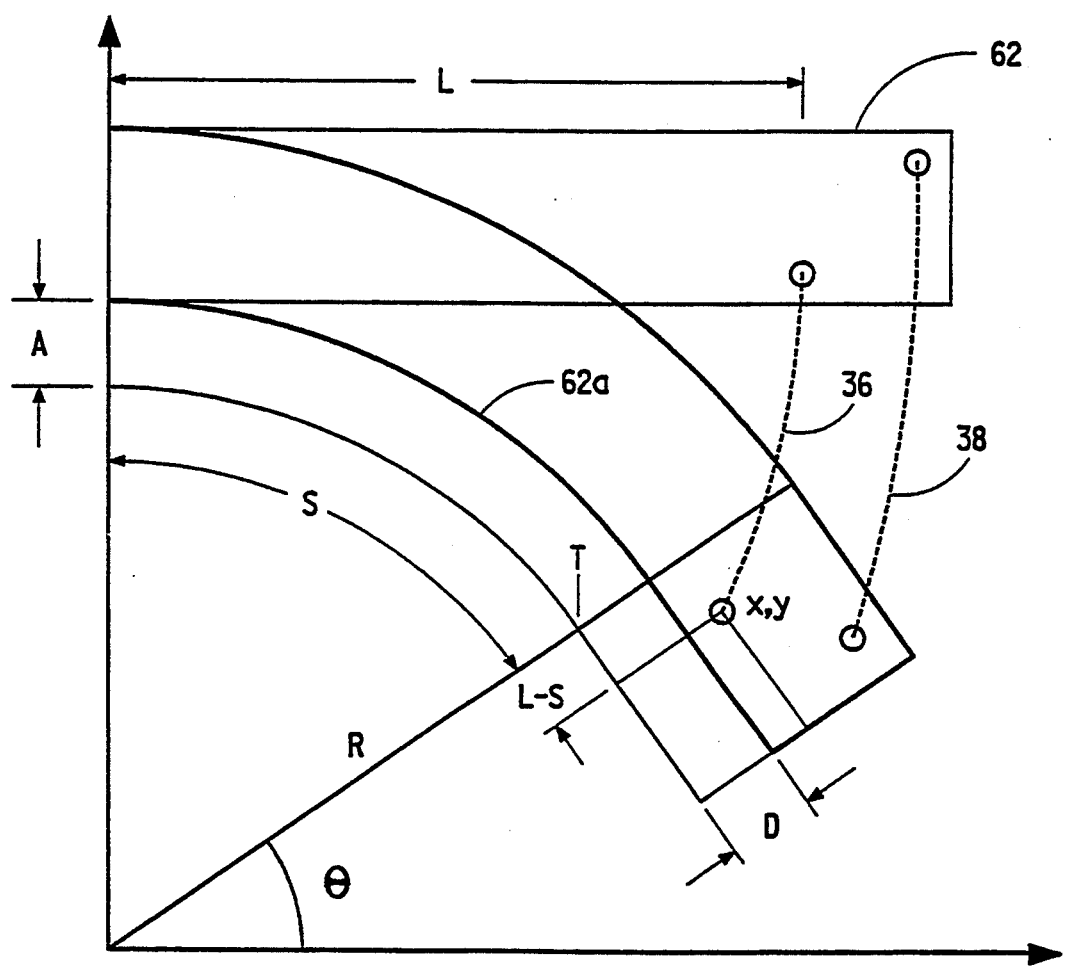
FIG. 2 is a schematic illustration of a format for calculating the cam track path of the apparatus shown in FIG. 1.

As best shown in FIG. 2, the path of the cam tracks 36, 38 is generated from the geometry of the final curvilinear shape desired as defined by the lower edge 62a of the final shaped component length. More particularly, when forming a shaped article in a predefined path of a plurality of component lengths, each component length being determined by dependent variables S, x, y and independent variables L, R, D and O wherein x,y are coordinates of points that generate the cam track path 36, 38, L is the length of the unformed material, S represents the intermediate arc length of one of the component lengths, R is the radius of curvature of the arc S, D is the offset distance of the x,y coordinates from a line tangent to the arc S at its end point T, and O is the angular location of the coordinate of the tangent point T. The remaining portion of the straight length is equal to L minus S. In order to properly determine the shape of the cam tracks, it is necessary to define arc length S as having zero stretch spaced a uniform distance A from the lower edge 62a.

Figure 3:
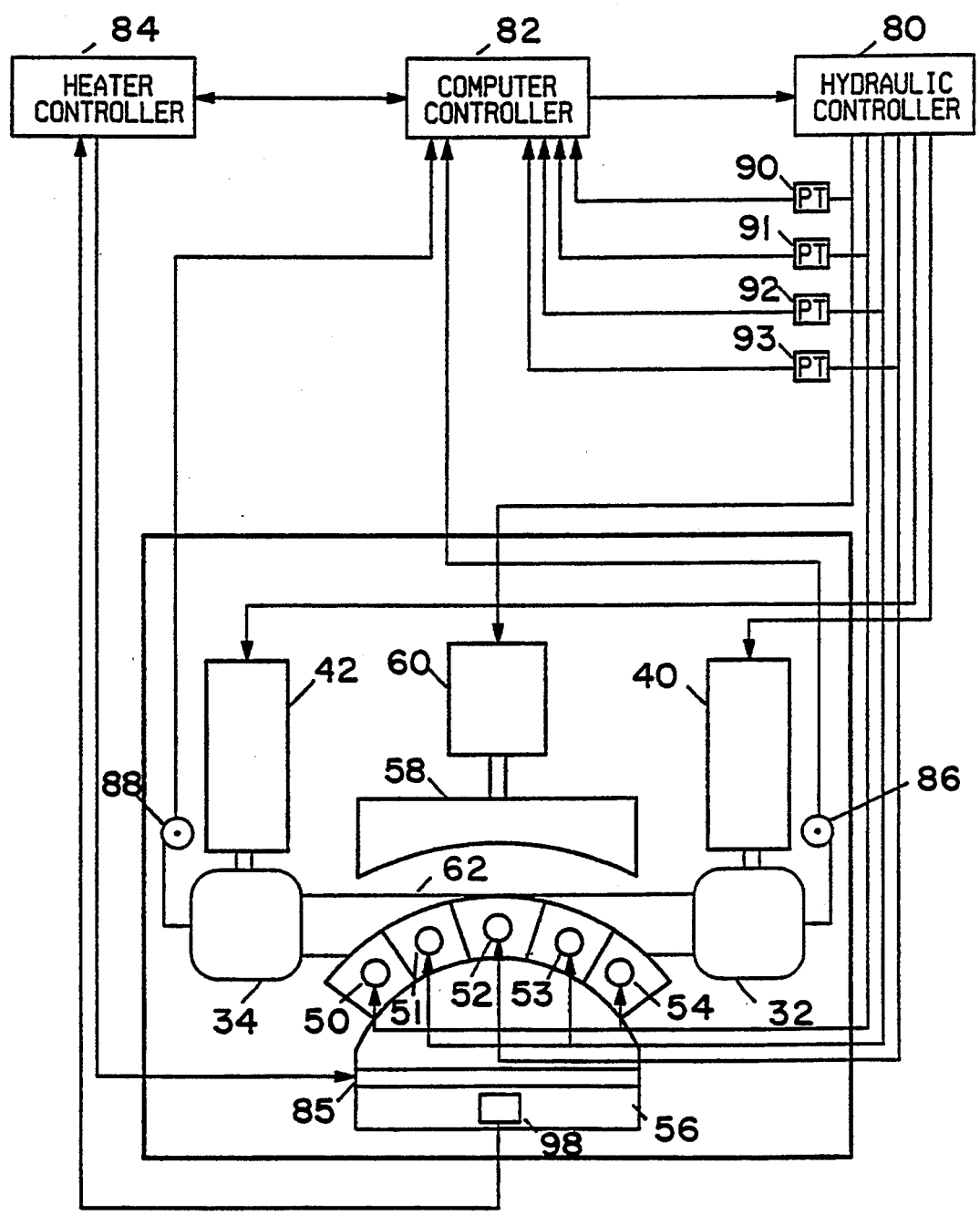
FIG. 3 is a schematic block diagram of the computer controlled system for regulating the operation of the apparatus for shaping the fiber reinforced resin matrix structures of this invention.

The x,y coordinates are expressed as a function of the independent variables L, R, D and O such that when $S = R(90-O)$ then:

$x = R \cos(O) + (L - S) \sin(O) + D \cos(o)$
$y = R \sin(O) - (L - S) \cos(O) + D \sin(O)$ Referring now to FIG. 3, computer 82 (Allen Bradley programmable logic controller, Series 515, Model 1785-LT) is connected at its output terminals to a hydraulic controller 80 and a heater controller 84. The hydraulic controller 80 in turn is connected to cylinders 40, 42, 50–54 and 60. The heater controller 84 is connected to electric cartridge heater 85 located in base tool 56. Inputs to the computer include position sensors 86, 88 located on end clamps 32, 34 for the purpose of signalling when the hydraulic cylinders 40, 42 have stretched the stock length 62 to the intermediate positions corresponding to the tangent points of the individual component lengths. Additional inputs to the computer consist of pressure transducers 90–93 for the purpose of determining when sufficient holding and consolidation pressure has been achieved. Thermocouple 98 in base 56 is inputted to the heater controller 84 for the purpose of sensing the temperature and signalling the controller.

Figure 4:
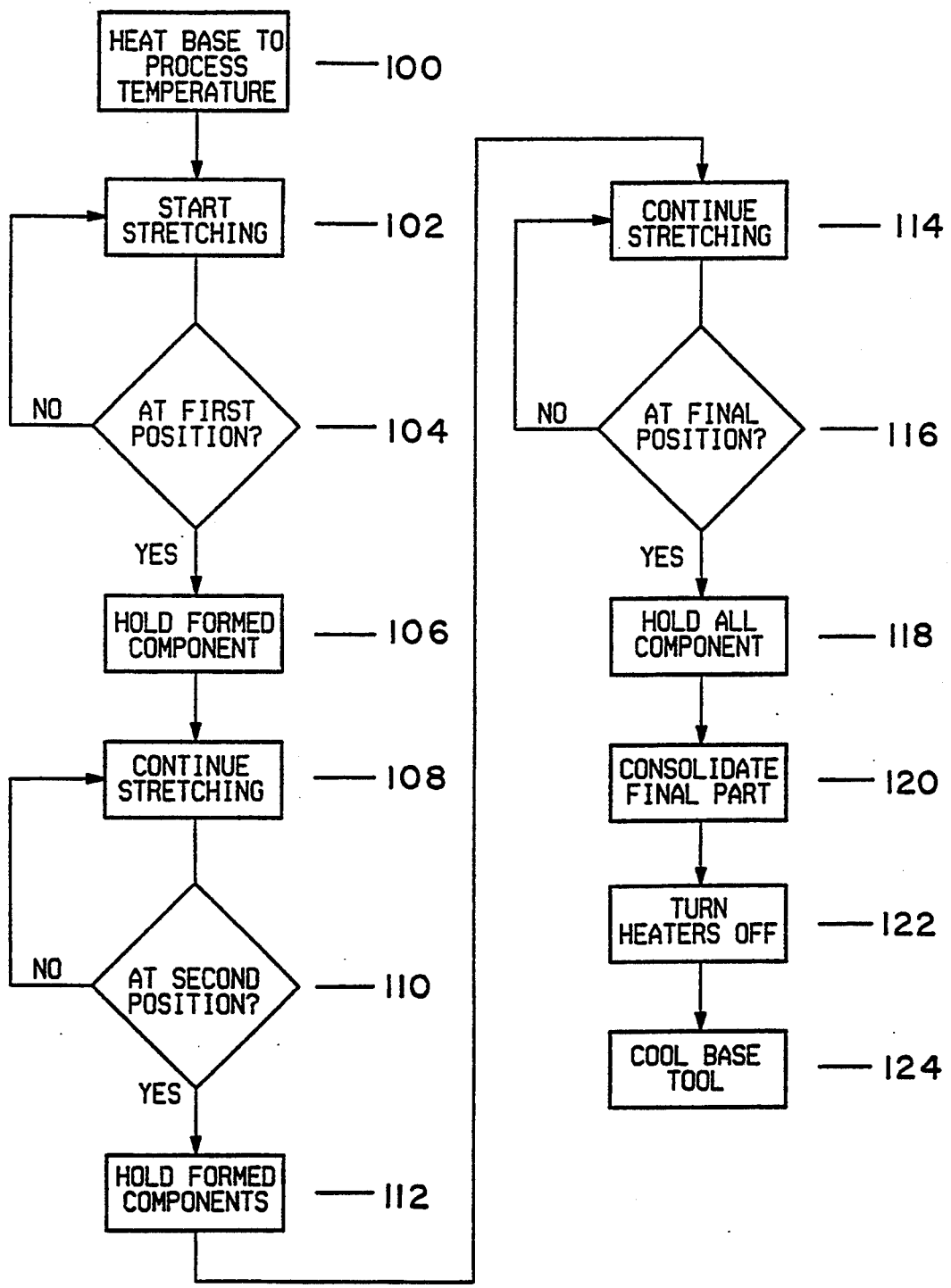
FIG. 4 is the logic flow diagram of the computer program for the operation of the apparatus.

The logic flow diagram (FIG. 4) illustrates the operation of the apparatus as follows: upon placement of the stock length 62, clamped into end clamps 32, 34, the sequence of operation is started. In step 100, heat is applied to the electric cartridge heaters 85 through the heater controller 84. Thermocouple 98 senses the level of the temperature and signals when the operating temperature is reached. The computer signals the hydraulic controller 80 to start the stretching operation (step 102) and clamps 32, 34 are moved in tracks 36, 38 via hydraulic cylinders 40, 42 which are attached to the respective clamps to form a first component length. When the first component length position is reached, as sensed by sensors 86, 88 signals are fed to computer 82 (step 104) which in turn signals controller 80 to actuate cylinder 52 which moves holding tool 46 against the stock length 62 to hold the formed component length in place as indicated in step 106. In the next step in the program, the computer signals hydraulic controller 80 to continue stretching until the two adjacent component lengths are formed (step 108). When the two adjacent component lengths are formed at the second stretching position as sensed again by sensors 86, 88 (step 110), signals are fed to the computer 82 which in turn signals controller 80 to actuate cylinders 51, 53 which move their respective holding tools against the stock length to hold these formed component lengths in place (step 112). In the next step in the program, the computer signals hydraulic controller 80 to continue stretching until the two final component lengths are formed (step 114). When the two final component lengths reach their final position as sensed again by sensors 86, 88 (step 116), signals are fed to the computer 82 which in turn signals controller 80 to actuate cylinders 50, 54 which move their respective holding tools against the stock length to hold the formed component lengths in place (step 118). At the actuation of the final holding cylinders, the computer signals the hydraulic controller to actuate the cap tool cylinder 60 to consolidate the final part, turns the heaters 85 off and circulates cooling fluid (in a manner not shown) through the base tool 56 as indicated by steps 120, 122 and 124.

Figure 5:
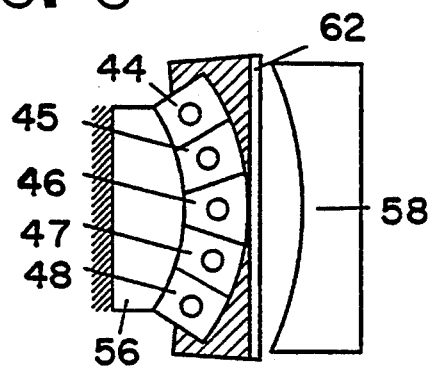
FIGS. 5-12 are schematic illustrations of the steps of the operation of the apparatus of FIG. 1 in shaping a structure of the invention.
Figure 6:
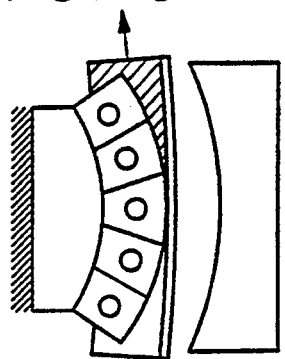
Figure 7:
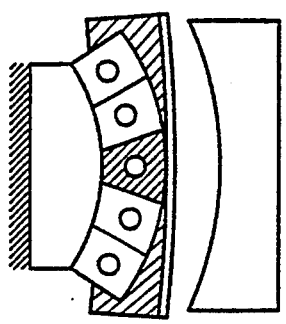
Figure 8:
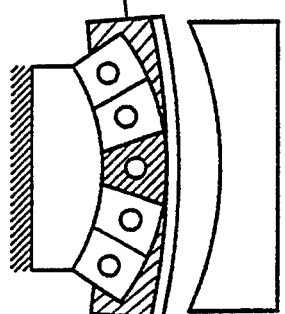
Figure 9:
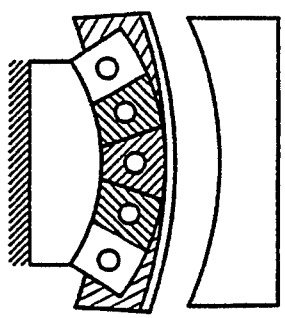
Figure 10:
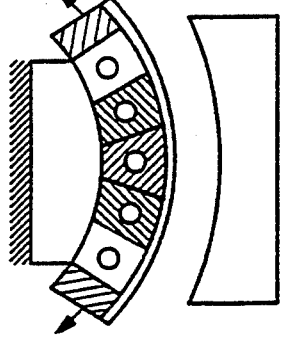
Figure 11:
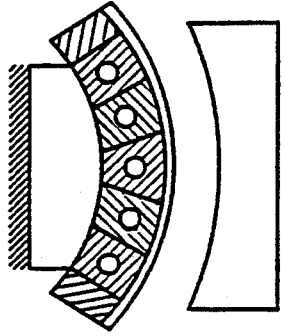
Figure 12:
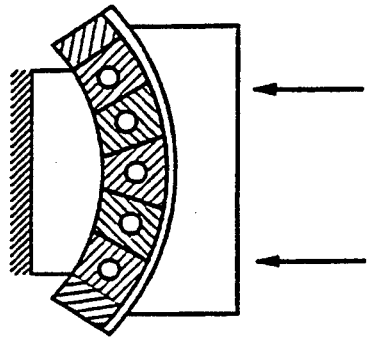
Figure 14:
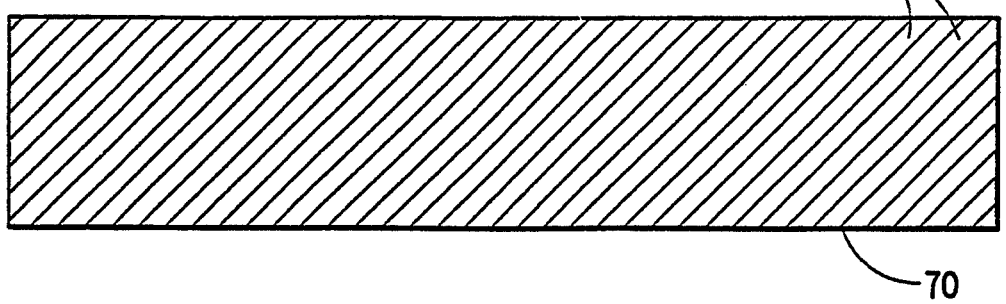
FIGS. 14-17 are schematic plan views of the individual plies in FIG. 13 showing fiber orientation.
Figure 15:
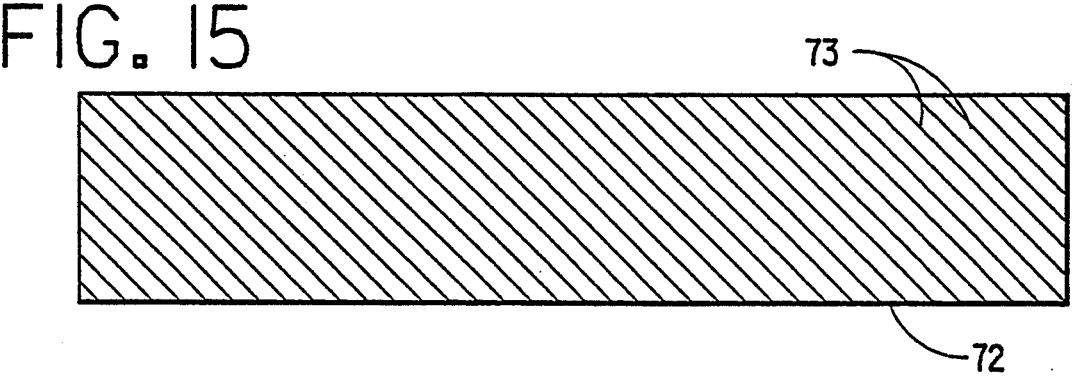
Figure 16:
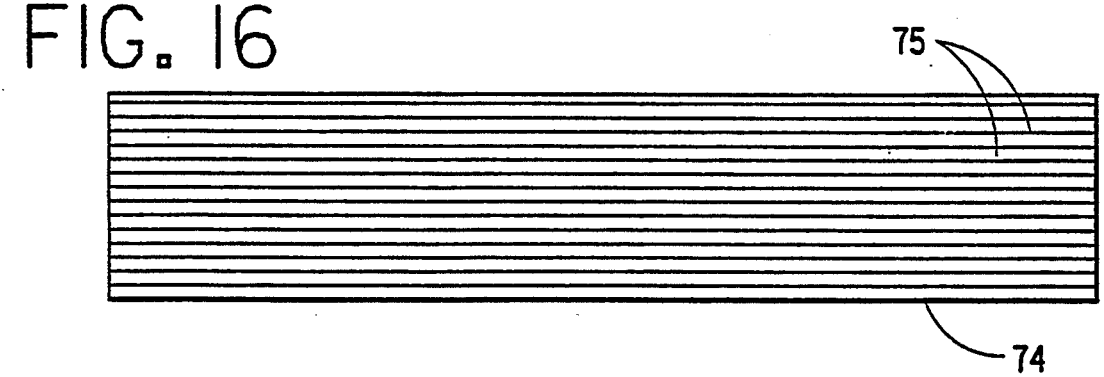
Figure 17:
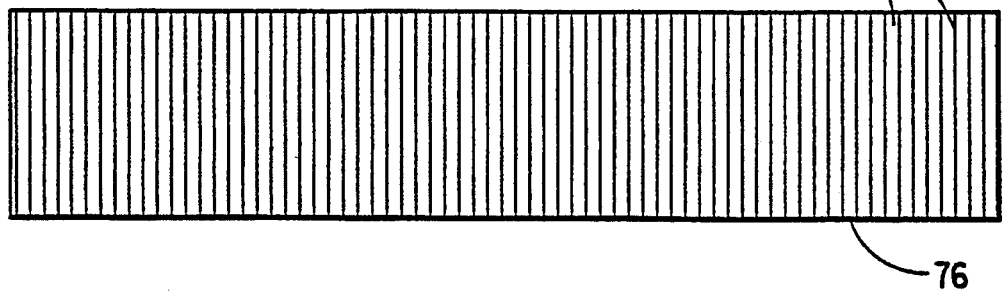
Figure 19:
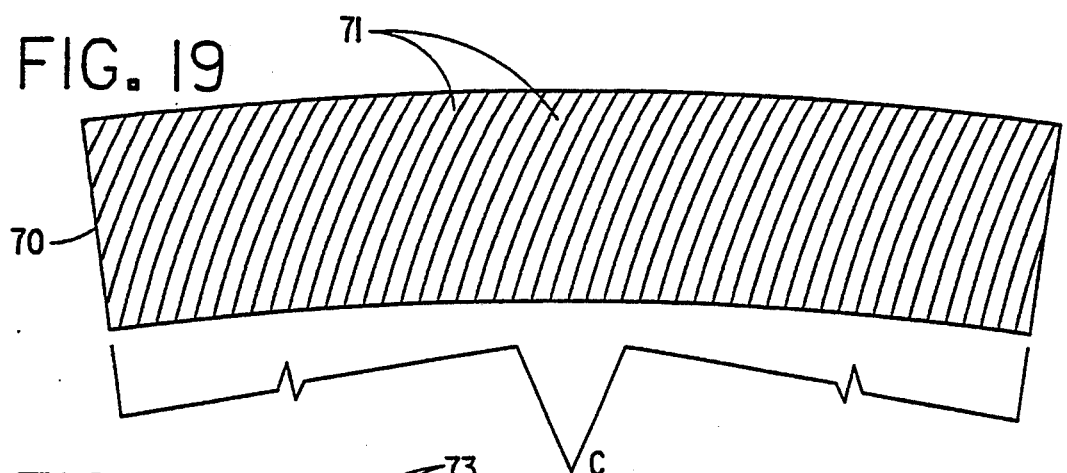
FIGS. 19-22 are schematic illustrations of fiber orientation in various plies of the shaped article of FIG. 18.
Figure 20:
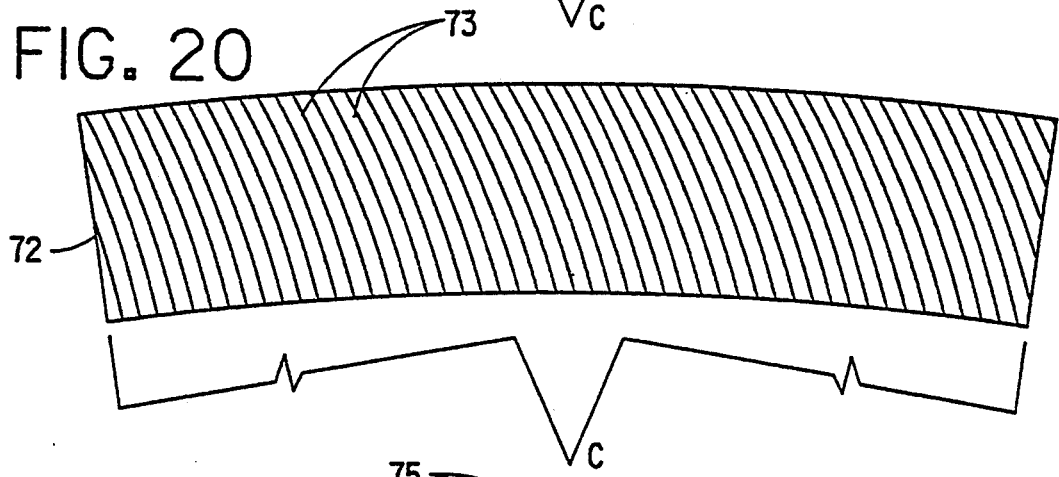
Figure 21:
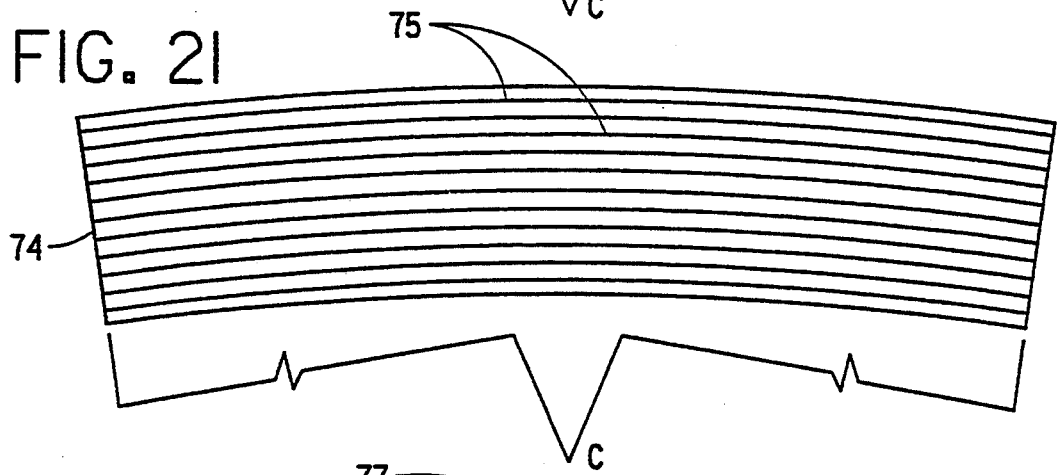
Figure 22:
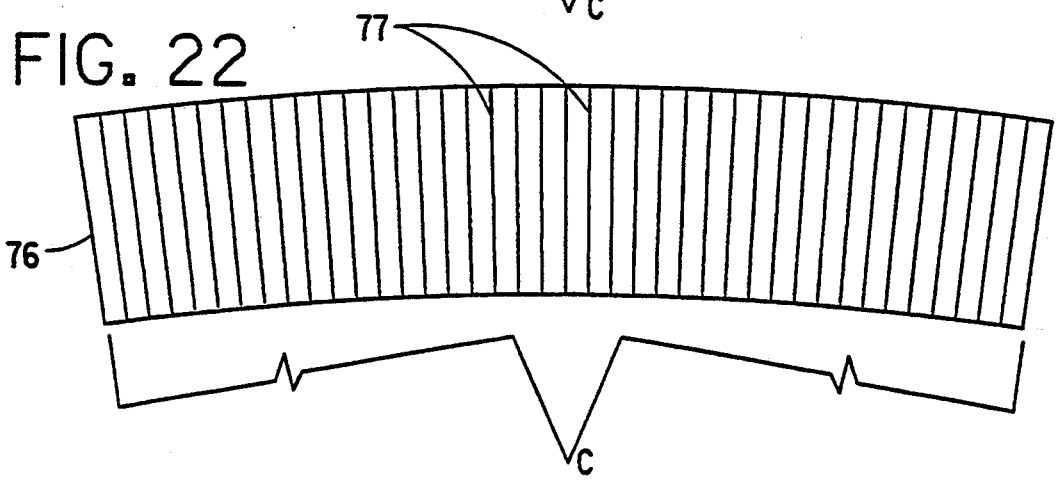
Figure 23:
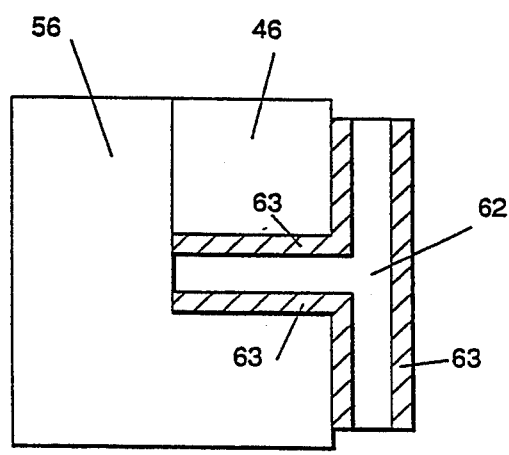
FIGS. 23-27 are enlarged cross sectional views taken along line 23—23 of FIG. 1 representing the forming of T, H, C, J and O or hollow shaped cross sectioned parts respectively.

The forming steps are best shown in FIGS. 5–12. FIG. 5 illustrates the initial set-up with the stock length 62 located in the forming apparatus with no force applied. The stock length 62 is clamped in position and then heat is applied via base 56. When the stock length 62 reaches the process temperature for the particular resin employed, the stock part is stretched to form the center component length (FIG. 6) by extending cylinders 40, 42 until the straight length is tangent to the arc at the end of the center component length. Once this center component is formed, the holding tool cylinder 52 is extended to move holding tool 46 to hold the component length in place (FIG. 7) while the adjacent component lengths are formed (FIG. 8) and held (FIG. 9). The final stretching occurs for the remaining component lengths (FIG. 10) and then the formed part is consolidated by the remaining holding tools 44, 48 (FIG. 11) and the cap tool 58 (FIG. 12).

The stock length 62 is best described by FIGS. 13–17 and is seen to consist of a cap portion 64, web portion 66 and a filler 68. This particular product as referred to above may be considered to have three laminate surfaces with one junction and one filler 68. More particularly, the three laminate portions are 66a, 66b and 64. The filler 68 is enclosed by the junction 68a. While we have described this specifically for the T section, the same descriptive arrangements apply for laminate surfaces, junctions and fillers of the other shaped structures mentioned above such as the L, C, O, Z, J, I and hat shaped sections. The plies that form the web also form the lower portion of the cap. The upper portion of the cap is formed by additional plies. The cap portion and the web portion are composed of a plurality of plies with each ply consisting of fiber reinforced resin matrix material wherein the fibers in each ply are oriented with respect to the longitudinal axis in transverse and non-transverse directions. The fibers in the non-transverse direction are randomly broken while the fibers in the transverse direction may be continuous or randomly broken. More particularly, the fibers 71 in ply 70 are oriented at 45° to the longitudinal axis, the fibers 73 in ply 72 are oriented at −45° to the longitudinal axis, the fibers 75 in ply 74 are oriented at 0° to the longitudinal axis and the fibers 77 in ply 76 are oriented at 90° to the longitudinal axis. Thus the fibers in plies 70, 72 and 74 are oriented in substantially non-transverse directions while the fibers in ply 76 are transverse to the longitudinal axis. This can more clearly be seen by referring to FIGS. 14–17. Referring back to FIG. 13, a filler 68 consisting of fibers oriented at 0° direction to the longitudinal axis in a resin matrix material, is used to fill the void formed where the web intersects the cap.

Referring now to FIGS. 18–21, a stretch formed length is shown where in plies 70, 72, 74 the fibers 71, 73, 75 oriented in the non-transverse directions are curved with respect to the center for the radius for that particular portion of the composite structure while the fibers 77 oriented in the transverse direction in ply 76 are directed toward the center for the radius for that particular portion. It should be noted that fibers in FIGS. 19–22 after shaping remain oriented with respect to each other and the longitudinal axis of the structure and thus insure the fibers are in the predicted location to provide the optimum strength for the particular application. While the preferred embodiment has been described as a composite structure in the form of a T, it is to be understood that this method may be used to an advantage to form parts that have other structural shapes.

Referring to FIGS. 23–27, alternate shaped cross section parts are shown along with the support members where needed. More particularly, in FIG. 23 there is shown a T-shaped cross section covered with aluminum sheeting 63 and held in place by holding tool 46 and base tool 56. Similarly in FIG. 24, an H-shaped composite structure 61 covered with aluminum sheeting 63 is held in place by holding tool 46 and base tool 56.

Figure 24:
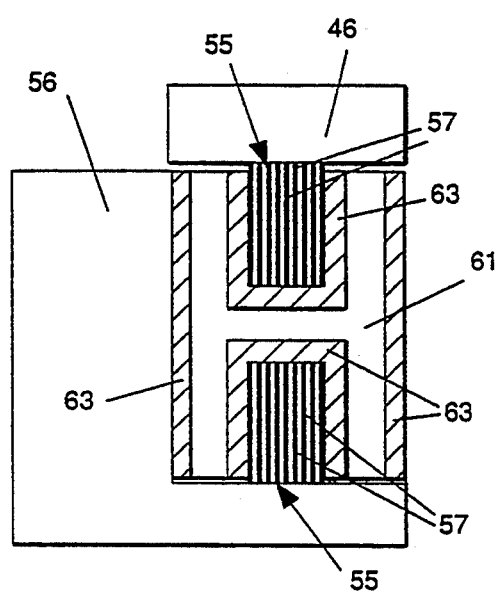
Figure 24A:
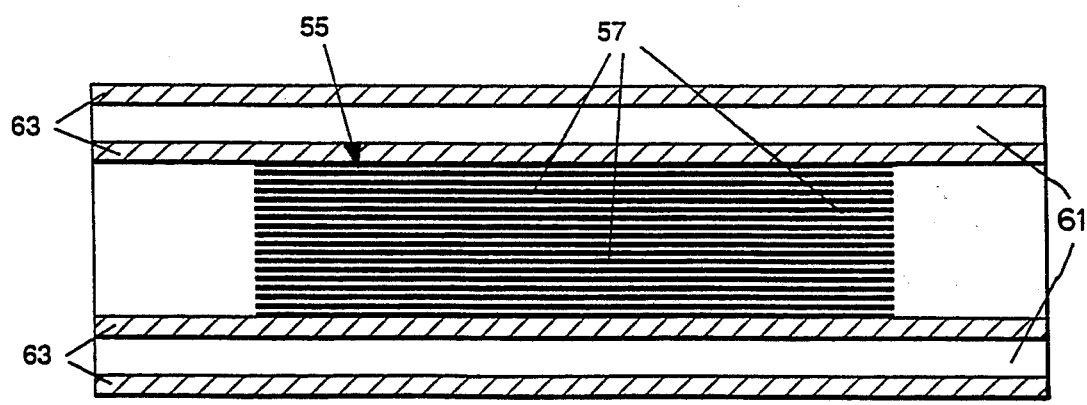
FIG. 24a is a broken away enlarged plan view of FIG. 24 designed to show the structure of the support member used.
Figure 25:
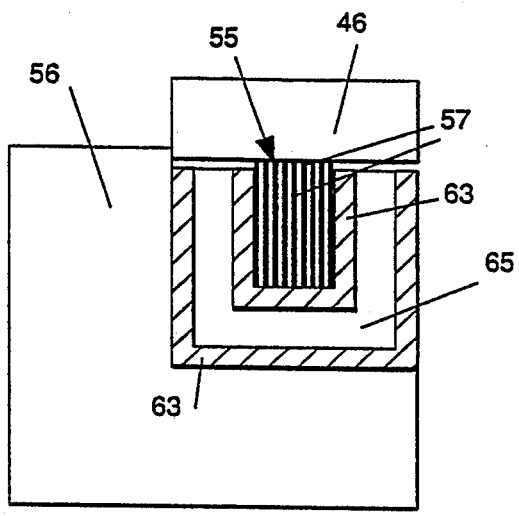
Figure 26:
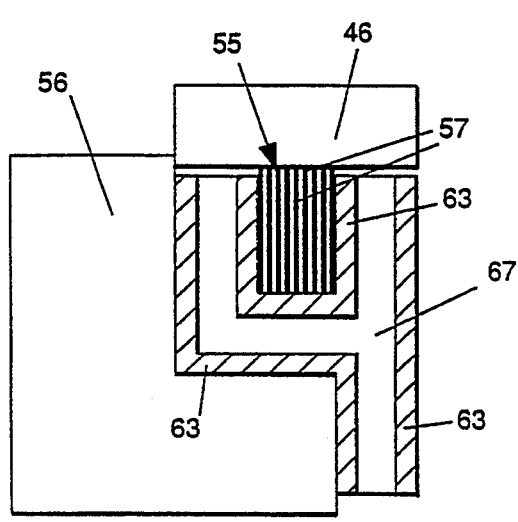
Figure 27:
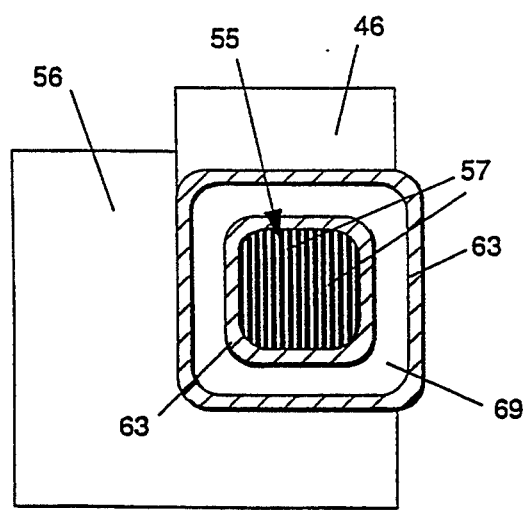

With this particular configuration, the support members 55 are positioned in the interior portions of the H-shaped cross section. The support members comprise a plurality of stacked steel strips 57 as shown in FIG. 24a. The steel strips 57 are free to move in the longitudinal direction one with respect to the other. The support member structure is the same for FIGS. 25, 26 and 27 which show C-shaped, J-shaped and hollow O-shaped configurations held in place by holding tool 46 and base tool 56. It is to be understood that support members 55 are not clamped at its ends in clamps 32 and 34 as is the stock lengths 61, 62, 65, 67 and 69.

In the preferred embodiment the support 55 is disclosed as a stack of steel strips. It is to be understood that while the steel strips are preferred because they are flexible in the forming or longitudinal direction while being rigid in the supporting directions which are normally perpendicular to the longitudinal direction, any other support member which would meet these criteria would also be suitable for this purpose.

Figure 28:
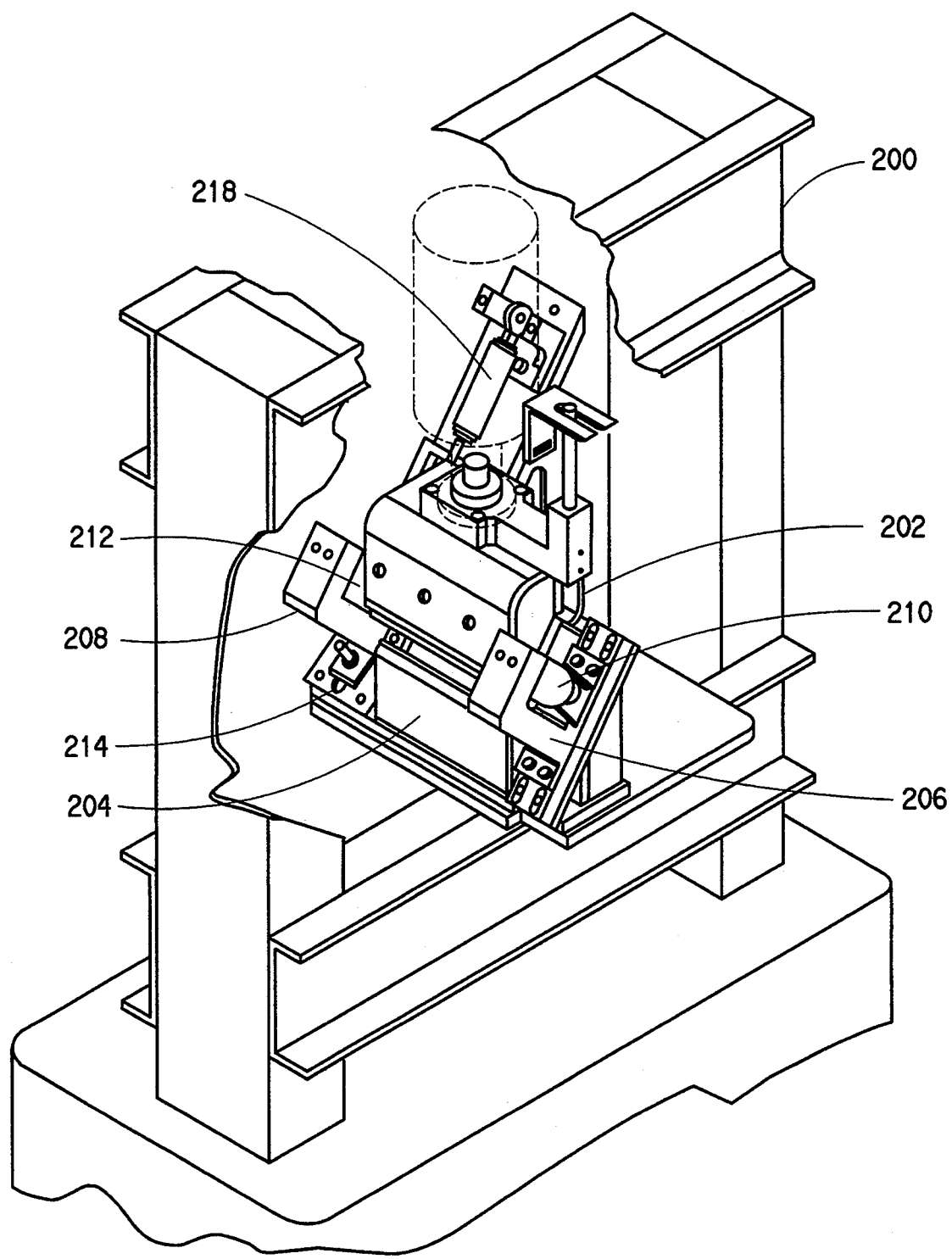
FIG. 28 is a schematic perspective view, partially broken away from an alternate apparatus embodiment useful in shaping material according to this invention.

Another preferred embodiment of the apparatus is shown in FIG. 28. It consists of a frame 200 and houses a movable tool 202 and a stationary tool 204. Both tools have heaters embedded within and passages for air cooling. If the part to be shaped is a T, J or C section, the frame will also house additional tools or actuator as previously described. For these parts, a mandrel is also necessary to stabilize the part during forming. Two clamps 206 and 208 are attached to the frame at opposite ends of the forming area for the purpose of holding the part to be formed. The clamps are opened and closed by the action of hydraulic cylinders 210, 212. In order to form the part, one clamp 208 is moved through a cam track 214 and another cam track (not shown) by a hydraulic cylinder 218.

Figure 29:
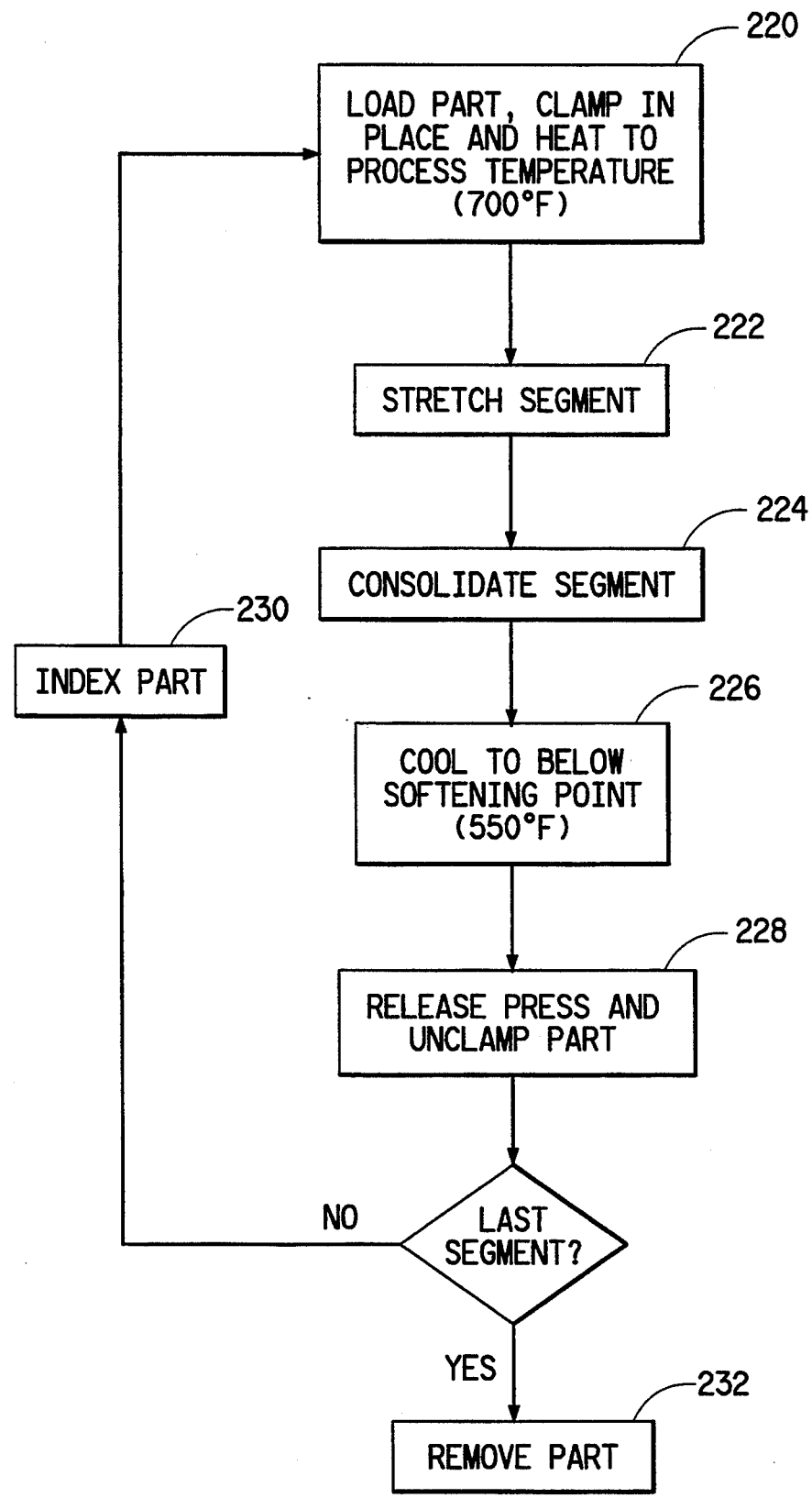
FIG. 29 is the logic flow diagram of the computer program for operating the apparatus of FIG. 8.

The logic flow diagram, FIG. 29, illustrates the operation of the apparatus. When the part is in place, the clamps are closed, the heaters in the movable and stationary tools are turned on, and the part is heated to the process temperature, all as indicated in step 220. This process temperature is dependent on the resin used. Once the part reaches process temperature, it is stretched in step 222 by moving one clamp through a cam track as described in U.S. Pat. No. 4,927,581. When the forming is complete, the tools are closed in step 224 in order to consolidate the part. They are kept closed for a sufficient amount of time to allow the resin to evenly distribute throughout the fiber matrix. This time period is commonly known as the soak period. Sufficient pressure is applied during this soak period and the entire cool down period to reconsolidate the part. The heaters are turned off and the air cooling is turned on during the cool down period in step 226. The part must be cooled to a low enough temperature to insure that the part will not deconsolidate, i.e., allow the fiber structure to expand, when the mold is opened. Once this temperature is reached, the mold is opened 228 and the part may be indexed in step 230 and the process repeated on a subsequent section. If this is the last section of the part, it may be removed as shown in step 232.

For a specific class of large contoured composite parts, this technique is advantageous. By forming a small portion of the part and then indexing and forming additional segments, large constant radius parts may be formed with relatively small tooling.

Figure 30:
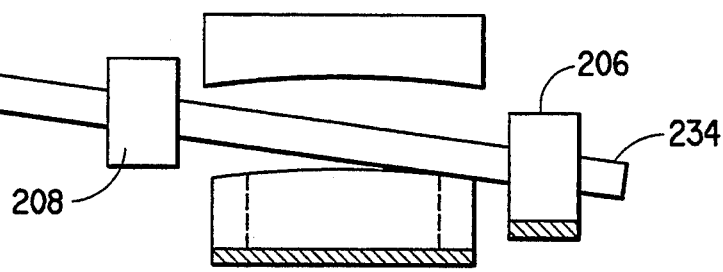
FIGS. 30-34 are schematic illustrations of the steps of the operation of the apparatus of FIG. 28 in shaping a structure.
Figure 31:
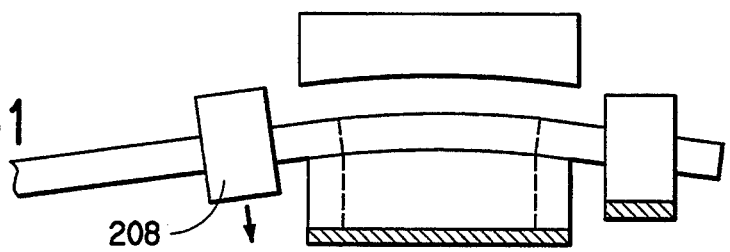
Figure 32:
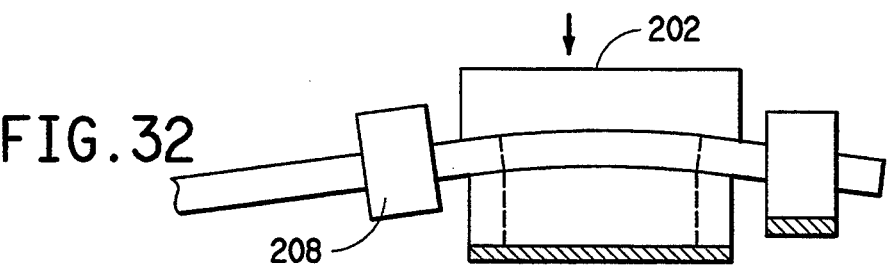
Figure 33:
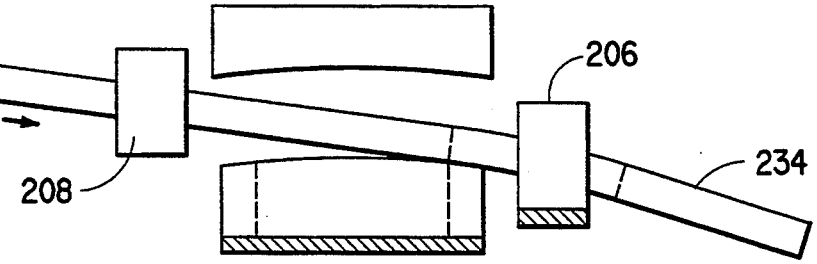
Figure 34:
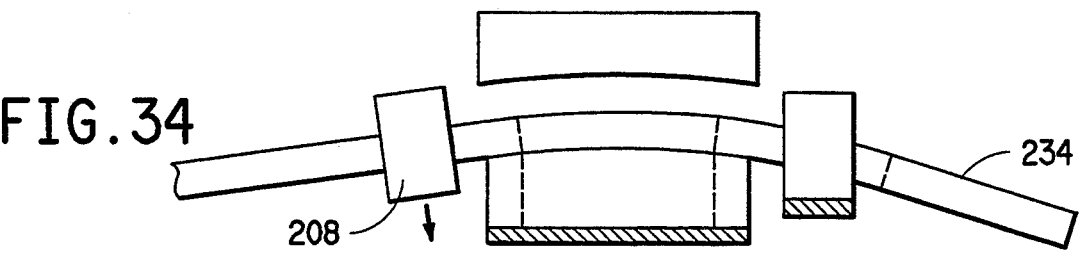

FIGS. 30–34 illustrate this technique with constant radius tools. In FIG. 30 the unformed rigid part 234 is indexed into the forming station and held in place by clamps 206 and 208. In FIG. 31, the part is formed by moving clamp 208 in the direction of the arrow. In FIG. 32, the movable tool 202 is lowered and pressure applied to consolidate the part. Once cooling is complete, the mold is reopened. In FIG. 33, part 234 is indexed in the direction of the arrow so that the formed section is held in clamp 206 and an unformed section is held in clamp 208. The clamp 208 is moved in the direction of the arrow as shown in FIG. 34 to form this additional section. It is not necessary that these sections are adjacent.

Figure 35:
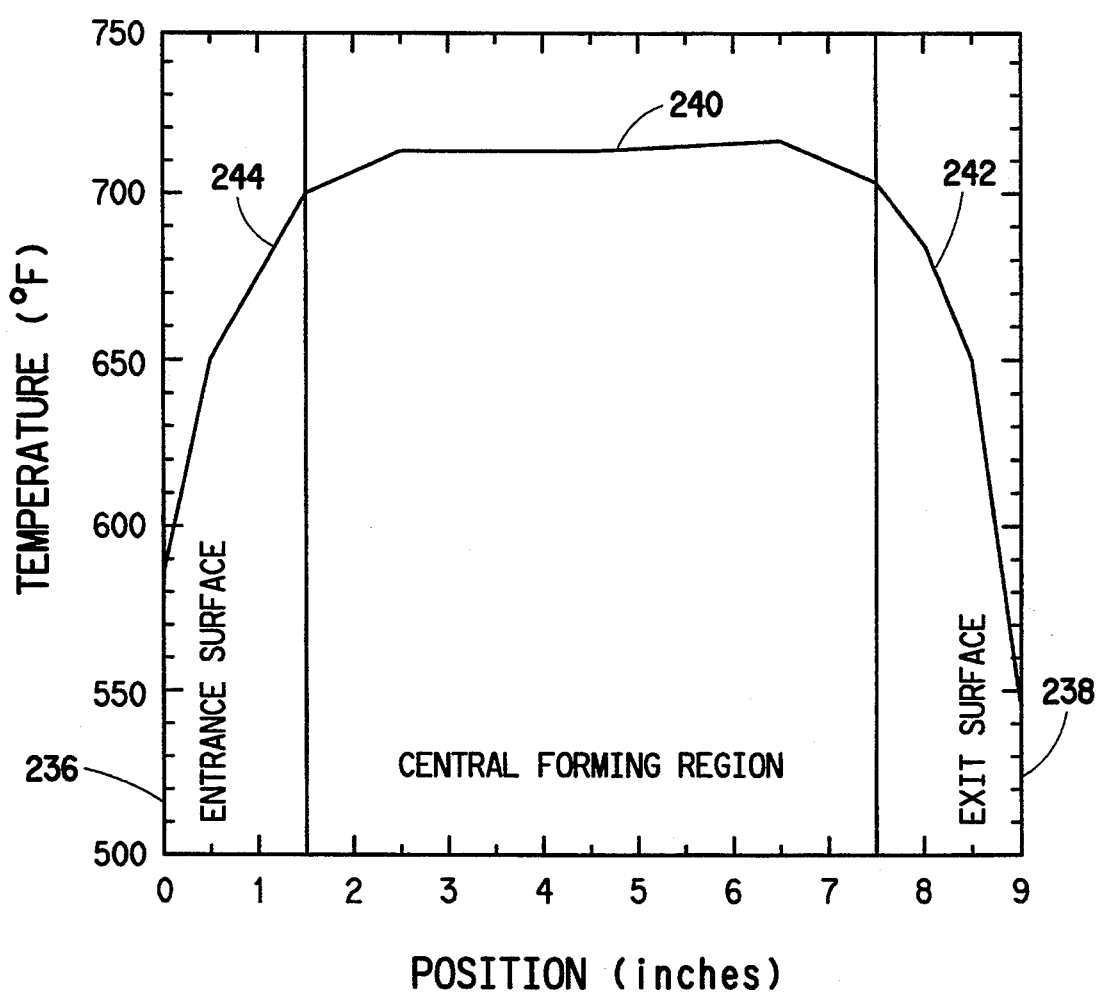
FIG. 35 is a typical thermal profile of a part being formed in conjunction with the steps shown in FIGS. 30-34.

Knowing the actual thermal profile of the tools is critical for forming a good part. A typical thermal profile of a part held in the heated tools is shown in FIG. 35. For clarity the ends of the tool will be referred to as the entrance and exit surfaces. The entrance surface is that near clamp 208 and the exit surface is near clamp 206. Referring to FIG. 35, the temperature of the tool at the entrance surface 236 and the exit surface 238 must be below the temperature at which the material deconsolidates. Moving toward the center of the tools, the temperature quickly rises to the process temperature. This region in the center 240 is at the process temperature and is the portion of the part that will be formed during this cycle. The region between this center portion and the exit surface 243 could have been formed during the previous cycle. The region between the center portion and the entrance surface 244 may be formed during the next cycle.

Tool temperature is an important consideration in forming a part. High process temperatures are required for many polymer systems. The temperature must be very uniform across the part in order to insure minimum forming forces due to lower polymer viscosity, yet not too high to promote polymer degradation, i.e., above the melt temperature but below the degradation temperature of the polymer. The portion of the part contained within the tool, but below process temperature, i.e., regions 242, 244 in FIG. 35, should be minimized to insure the highest possible utilization of the tools.

Therefore the desired temperature profile is as steep a gradient as possible at the entrance and exit surfaces and as constant a temperature in the central forming region. The portion of the part outside the tool must be kept below the deconsolidation temperature of the composite. By deconsolidation temperature is meant that temperature at which the polymer softens enough to allow the fiber structure to expand and hence entrap air in the composite part. A preferred method uses high velocity air jets to cool the portions of the part between the entrance and exit surfaces and the corresponding clamps. Additionally, the tool must allow pressure to be applied uniformly across the part to insure uniform resin flow and part consolidation.

Steel is a desired material for the forming tools because the thermal conductivity is low enough to insure the steep thermal gradients desired. Additionally, it is a durable material for tooling in general. Ceramic or other materials may also be used for the tools as long as they meet the above criteria. A monolithic tool is preferred because it provides uniform pressure and, therefore, good surface finish.

By proper placement of the heaters in the tooling material, the desired temperature profile can be achieved. Possible heat sources are electric cartridge heaters or oil heaters. This heat may be controlled utilizing single or multiple control zones. This facilitates achieving the desired profile.

Figure 36:
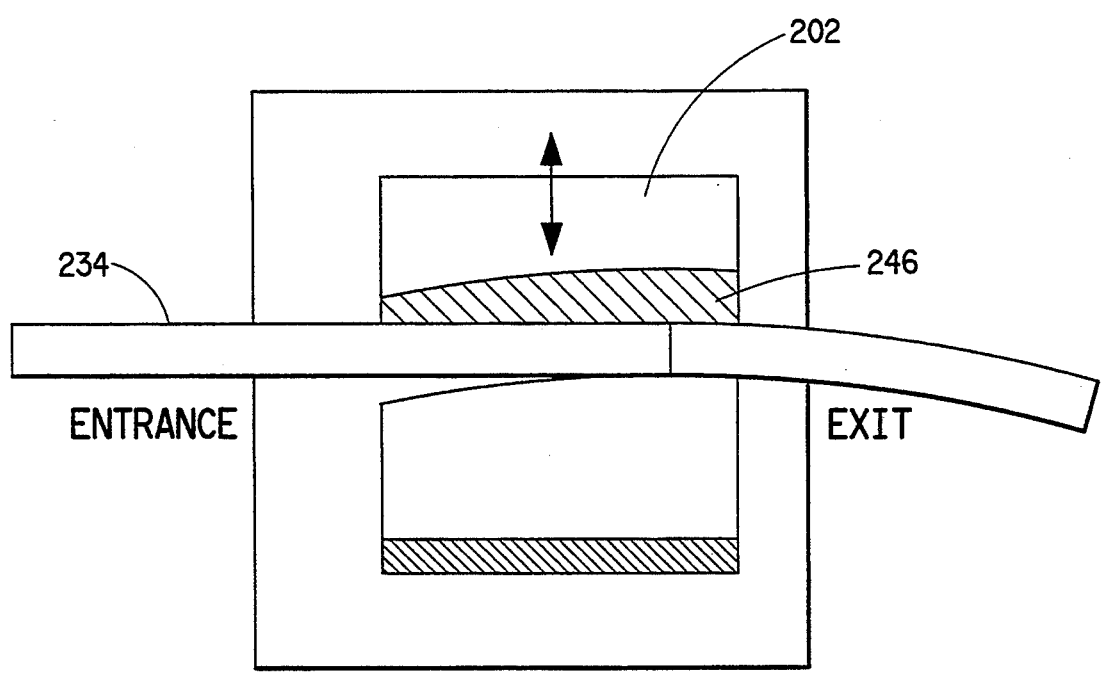
FIG. 36 illustrates the use of an adapter block with the forming tool of FIGS. 30-34.

During the initial heat up, the unformed part within the tools is not in complete contact with the tools. In order to insure that the part also achieves the desired thermal gradient, an adapter block may be used as shown in FIG. 36. This steel adapter block 246 is placed between the unformed part 234 and the movable tool 202. This adapter block remains in place during the forming. It is removed between steps 222 and 224 in the logic flow diagram 231.

Figure 37:
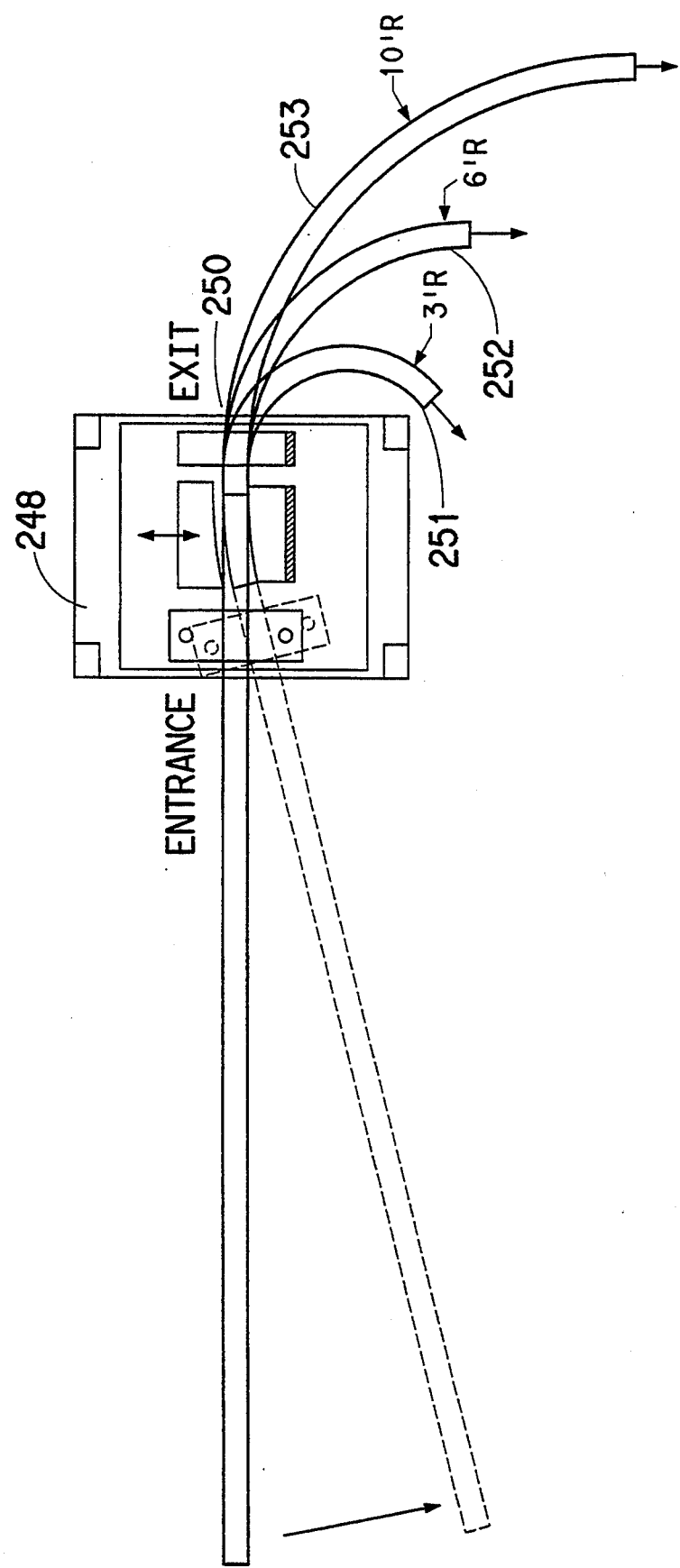
FIG. 37 illustrates formation of three separate parts by forming and indexing according to FIG. 29.

Adjacent segments may be formed such that a continuous curve will result. FIG. 37 depicts three separate parts formed by sequentially forming adjacent sections. The part is formed in the tooling section 248 using the above described process. Once forming on an individual segment is complete, the part is indexed to the right out the exit side 250 and the next adjacent segment is formed. A three foot radius 251, a six foot radius 252, and a ten foot radius 253 are shown. Obviously, each part requires different tooling.

The amount of movement and alignment on indexing is critical. The point at the entrance side of the central forming region is indexed to become the point at the exit side of the new central forming region. When indexing, it is important to align the previously formed segment that will be within the molds for this next forming segment very carefully. The part must be aligned such that it mates exactly with the surface of the stationary mold.

This cycle of heating, forming, cooling and indexing is repeated until the entire part is formed.

EXAMPLES

Example 1

A straight rigid flat strip of AS4 graphite fiber in polyetherketoneketone (PEKK) thermoplastic resin was formed into a planar contour with a 47 inch inner radius. The fiber volume was 60% and the fibers were discontinuous and aligned in the 0, 90 and ±45 degree directions. Steel tools were fabricated with electric cartridge heaters and air cooling passages. The tools were 9 inches long and yielded a 6 inch central forming region. The part was clamped in place and heated to 700° F. The entrance and exit edges were below 550° F. Once formed, the part was reconsolidated at 500 psi. Three adjacent segments were formed and the final part had smooth transitions between these segments.

Example 2

A 9.5 foot straight rigid Z beam of AS4 graphite fiber in PEKK thermoplastic resin was formed into a 90 degree included angle, 6 foot constant radius part. The fiber volume was 60% and the fibers were discontinuous and aligned in the 0, 90 and ±45 degree directions. Steel tools were fabricated with electric cartridge heaters and air cooling passages. The tools were 18 inches long and a 10° arc section was formed each cycle. The part was clamped in place and heated to 700° F. The entrance and exit edges were below 550° F. Once formed, the part was reconsolidated at 600 psi. Nine adjacent segments were formed and the final part had smooth transitions between these segments.

What is claimed is:

1. A method of shaping a rigid elongated composite structure of a polyetherketoneketone resin matrix reinforced with fibers into a predefined path comprising:
   a) defining said path as a plurality of component lengths;
   b) clamping said structure adjacent each end of a component length, stretching said component length from one of its ends by applying a force to said one end along its longitudinal axis away from said one end to shape the component length into the component length defined by said path;
   c) heating said structure intermediate its ends in a forming tool 9 inches in length, said forming tool being heated along the length of the forming tool according to the temperature profile shown in FIG. 35 while stretching the structure according to step (b);
   d) holding said component length of the structure in place to consolidate said component length;
   e) cooling the structure;
   f) unclamping said component length;
   g) indexing said structure to the next component length; and
   h) repeating steps (a) through (g) on the next component length.

2. The method of claim 1 wherein said predefined path has a curvilinear portion, said portion being defined as a plurality of component lengths.

* * * * *